March 4, 1969   J. R. METZ   3,430,382
AIRCRAFT DOOR ATTACHING AND RELEASE DEVICE
Filed Feb. 13, 1967
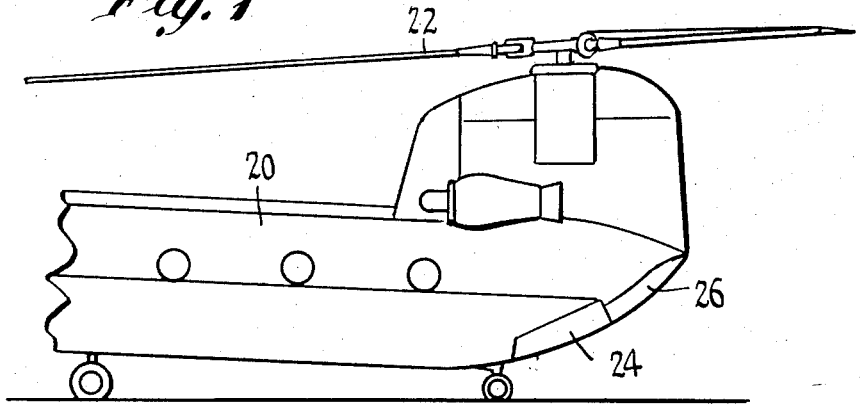
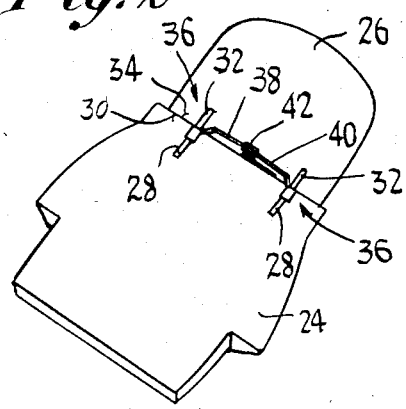
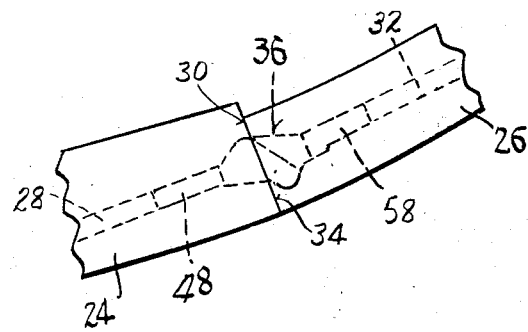
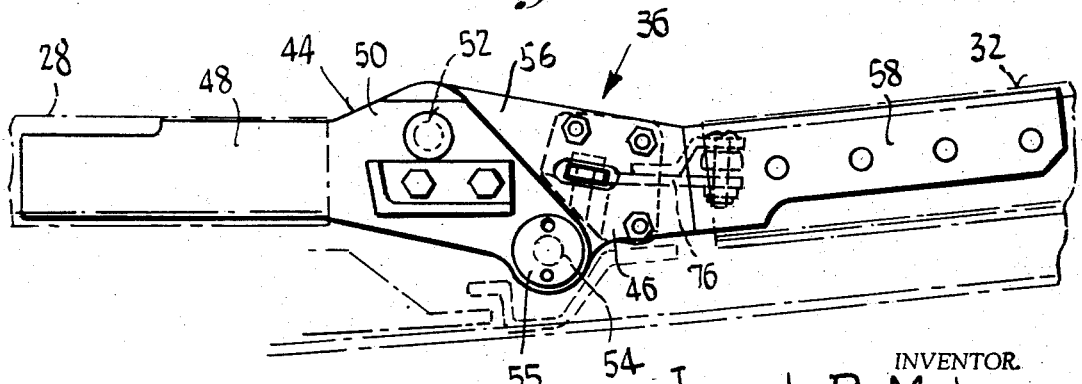
INVENTOR.
Joseph R. Metz March 4, 1969  J. R. METZ  3,430,382
AIRCRAFT DOOR ATTACHING AND RELEASE DEVICE
Filed Feb. 13, 1967
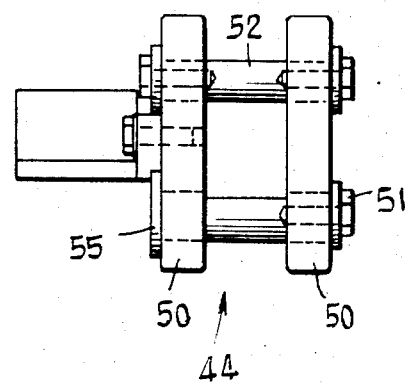
Fig. 9
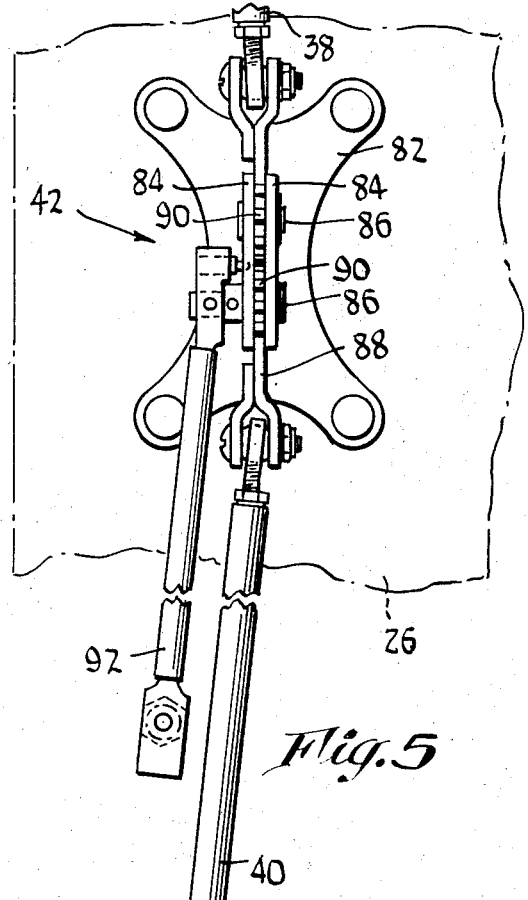
Fig. 5
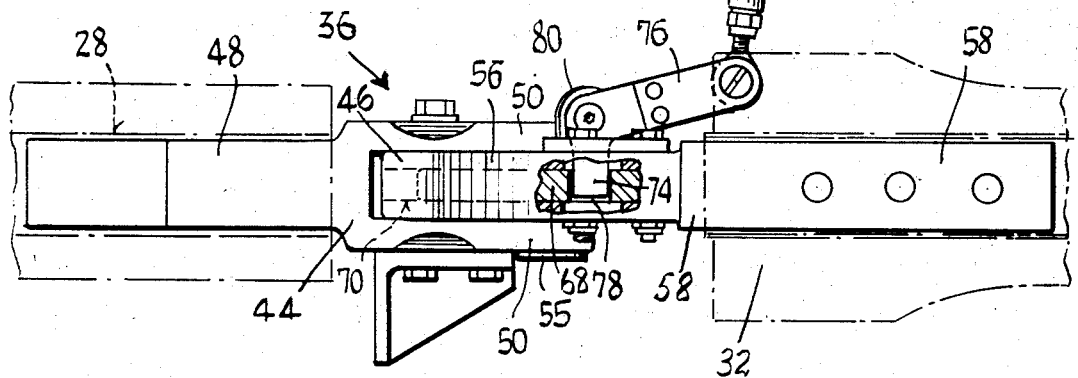
INVENTOR.
Joseph R. Metz
AGENT

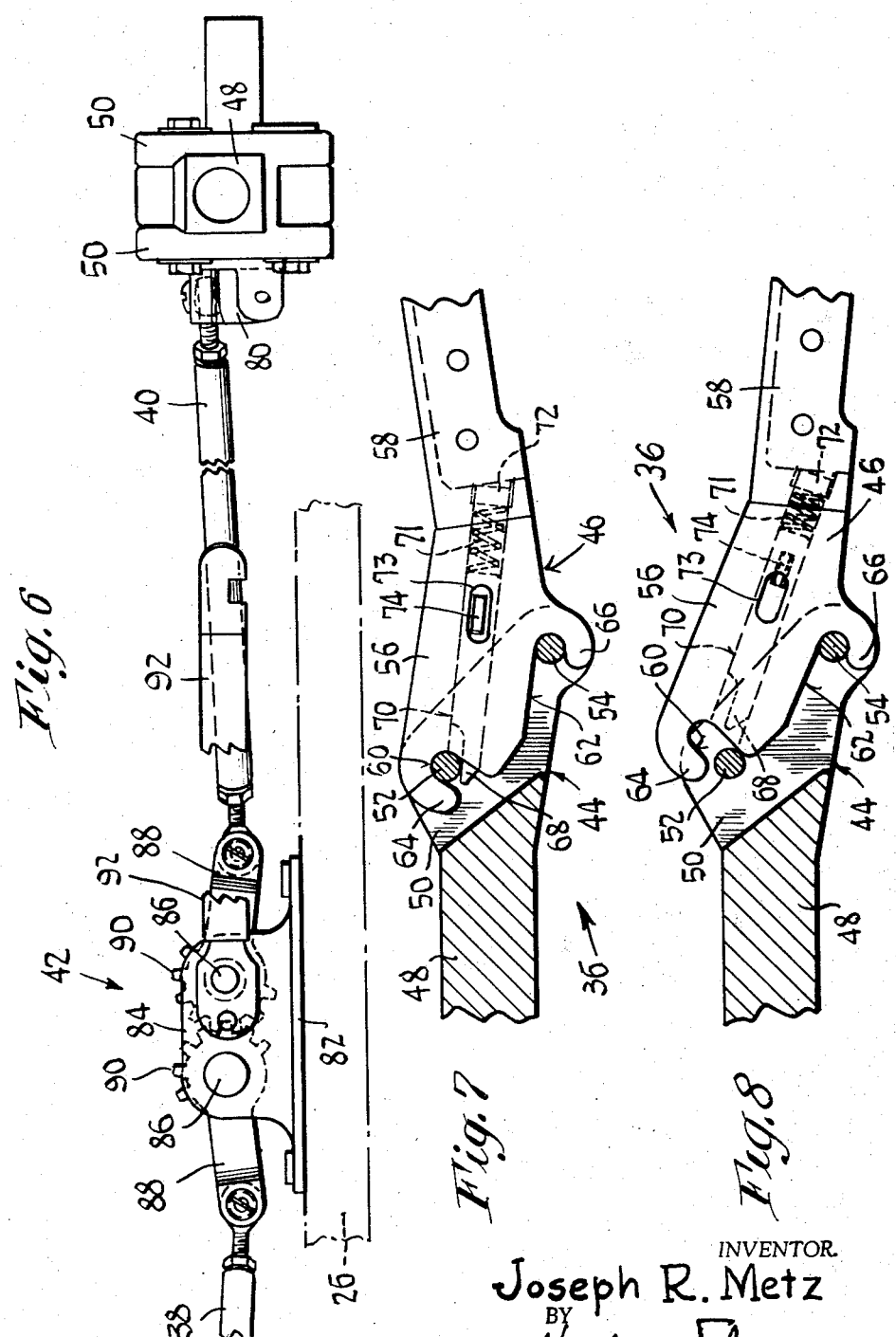

United States Patent Office 3,430,382
Patented Mar. 4, 1969

3,430,382
AIRCRAFT DOOR ATTACHING AND RELEASE DEVICE
Joseph R. Metz, Ridgefield, Conn., assignor to Norco, Inc., Ridgefield, Conn., a corporation of Connecticut
Filed Feb. 13, 1967, Ser. No. 615,798
U.S. Cl. 49—37                    10 Claims
Int. Cl. E06b 5/00, 5/12, 7/00

ABSTRACT OF THE DISCLOSURE

An attaching and release device for aircraft doors or closure panels, comprising separable two-part hinge fittings disposed at one door or panel edge and an adjoining jamb, said fittings having a common release mechanism and each comprising two spaced pin-and-solt connections between the parts, one of said connections being under the control of a releasing slide or draw bolt connected to the release mechanism. Drawing the bolts releases the associated pins from their slots, enabling the remaining pins to leave the remaining slots whereby the door or panel is free of its associated structure.

Cross references (1) U.S. Patent No. 346,906. (2) U.S. Patent No. 938,267. (3) U.S. Patent No. 1,669,418. (4) U.S. Patent No. 1,679,902. (5) U.S. Patent No. 2,577,790. (6) U.S. Patent No. 2,560,513.

Background

This invention relates to attaching and releasing devices for doors, panels and the like.

Previously, doors, cover members, panels and similar structures have been held attached and in closed position by fittings, bolts or the like which were disposed at several different edges of the structure. Such members could not be quickly wholly separated from the associated framework, or if such separation were possible the fittings and release mechanism with the associated cover or shield structures constituted a complicated, sizeable and costly system.

Summary

The present invention obviates the above drawbacks and disadvantages of prior attaching and release systems for doors, panels and the like. This is accomplished by providing a novel organization which includes two-part separable hinge fittings acting on the cantilever principles and located on the door or panel along one edge only, said fittings being thereby disposed as well along one jamb of the framework structure provided for the door or panel.

Other objects and advantages are to provide an improved heavy duty cantilever type attaching and release device for doors, panels and the like, which is wholly practical and feasible with as few as only two small-size fastenings, constituted as separable hinge fittings; to provide a device as above, which is simple in construction, sturdy and reliable in operation, compact and relatively small in size, and which requires but few parts including the common release mechanism; to provide an improved attaching and release device in accordance with the foregoing, which is not subject to looseness or rattle but instead is resistant to vibration and working forces to a marked degree; to provide a device of the character indicated, wherein interchangeability of doors or panels and/or other parts is readily had; and to provide, in a system as above set forth, an improved safety-type self-locking release system having an advantageous leverage by which powerful release forces may be applied to a plurality of locking draw bolt components with the use of but normal forces on the part of the operator.

Other features and advantages will hereinafter appear.

In the drawings:

FIG. 1 is a fragmentary side elevational view of a helicopter, showing the rear ramp and the adjoining cargo door or panel of the craft.

FIG. 2 is a diagrammatic representation of the rear ramp and cargo door, shown in perspective from above and the front.

FIG. 3 is a diagrammatic representation showing the rear ramp and cargo door in partial side elevation.

FIG 4 is a side elevational view of one of the novel two-part separable hinge fittings as provided by the invention, connected between adjoining edges of the rear ramp and the cargo door.

FIG. 5 is a top plan view of the separable hinge fittings shown in FIG. 4, together with the manually actuatable release mechanism associated with said fittings.

FIG. 6 is a side elevational view of the release mechanism of FIG. 5. This view includes an end elevation of one of the hinge fittings which connect the rear ramp and the cargo door.

FIG. 7 is a detail, partly in longitudinal section and partly in side elevation, of one hinge fitting shown in the locking condition.

FIG. 8 is a view like that of FIG. 7, but showing the hinge fitting in the releasing position.

FIG. 9 is an end elevational view of the dual-pin part of the hinge fitting shown in FIGS. 7 and 8.

Referring first to FIGS. 1–4, there is illustrated a helicopter having a body or fuselage 20, an aft rotor 22, a hingedly mounted rear ramp 24 and a releasable and disposable cargo door or panel 26. In FIGS. 2 and 3 the ramp 24 is seen to have a pair of beams or girders 28 extending to its rear edge 30, and the cargo door 26 has a similarly spaced pair of beams or girders 32 extending to its foremost edge 34 and adapted to align with the girders 28.

In accordance with the persent invention, novel and improved separable two-part hinge fittings indicated generally by the numerals 36 are provided between the ramp 24 and the cargo door 26 whereby the latter is normally supported in operative position yet may be quickly, easily and reliably released to completely fall away even when under full load, said fittings being associated with the girders 28, 32.

The releasable fittings 36 are coupled to each other by a common release mechanism comprising links 38, 40 and a common actuator 42 whereby both fittings can be simultaneously released, thereby to completely free the cargo door 26 for separation from the ramp 24 and fuselage 20 of the aircraft.

The separable hinge fittings 36 are identical to each other, and accordingly only one such fitting will be described in detail. Referring to FIGS. 4, 5 and 7–9, the hinge fitting 36 illustrated therein comprises two spaced pin-and-slot connections which involve a dual-pin anchorage part 44 and a cooperable receiver part 46. The anchorage part 44, which is attached to the jamb 30 of the ramp 24, comprises a shank 48 adapted to be secured to the beam or girder 28 of the ramp, and further comprises a pair of parallel spaced arms 50 through which there extend upper and lower pins 52, 54. As seen in FIGS. 7 and 8, the pin 52 is located above the longitudinal axis of the shank 48 and closer to the latter than the pin 54, which latter is located below the longitudinal axis of the shank.

Receivable in the space between the arms 50 is a hook-like portion 56 of the receiver part 46, said portion being secured to a shank 58 which is in turn fastened to the girder 32 of the cargo door 36. The portion 56 of the part 46 has a pair of slots 60, 62, forming rounded bill formations 64, 66 respectively on the receiver portion 56. The slots 60, 62 are adapted to fully receive the pins 52, 54 respectively, and are so arranged that when the pin 54 is fully reecived in the slot 62, the receiver part 46 is able to have pivotal movement whereby the upper pin 52 can enter fully or else leave the upper slot 60. However, when the upper pin 52 is fully received in the slot 60 and maintained therein, it is not possible for the lower pin 54 to leave its slot 62. Accordingly, separation of the hinge parts 44, 46 can only take place by having the pin 52 first leave the upper slot 60.

When the hinge fitting 36 is in the assembled and locked position as shown in FIG. 7, the upper pin 52 is retained in its slot 60 by means of a slide or draw bolt 68 carried by the portion 56 of the receiver part 46. The slide bolt 68 is movable in a bore 70 which opens into the upper slot 60 and which extends through the portion 56 toward the shank 58 thereof. A compression spring 71 and threaded plug 72 in the bore 70 act to bias the bolt 68 to the advanced locking position shown in FIG. 7. In the receiver portion 56 there is a transverse opening 73 which communicates with the bore 70 and receives an actuator arm 74 of a release bell crank 76. The arm 74 is disposed in a wide, loose-fitting notch 78 of the bolt 68 for the purpose of retracting the bolt against the action of the spring 71, as will be understood. The bell crank 76 is pivotally carried by a bracket 80 secured to the side of the receiver portion 56. In FIG. 7, the slide bolt 68 is in the advanced, locking position corresponding to the position of the bell crank 76 shown in FIG. 5. When the bell crank as seen in FIG. 5 is turned a slight amount counterclockwise, it will effect a retraction of a slide bolt 68 to the releasing position illustrated in FIG. 8.

Normally, considering FIGS. 1, 2, 3 and 7, it will be understood that the cargo door 26 is like a cantilever, and imposes a load on the fittings 36 which is in the form of a clockwise turning moment about an axis centered in the lower pin 54. Thus, immediately upon retraction of the slide bolt 68, the freeing of the upper pin 52 will result in a clockwise movement of the receiver parts 46 and the cargo door 26, and as soon as the pins 52 are out of the slots 60 of the receiver parts 46, the said parts and the cargo door carrying them can quickly, completely fall away from the cooperable hinge fitting parts 44 and the ramp 24 carrying said latter parts. An intermediate position in this procedure is illustrated in FIG. 8, and for this position the hinge parts 46 are already free to fall away to the right and downward, as viewed in FIG. 8.

Considering now the release mechanism for the hinge parts 36, this is clearly illustrated in FIGS. 5 and 6. Carried by the cargo door 26 is a centrally disposed bracket 82 having upstanding, spaced parallel stanchion plates 84 carrying pivot pins 86. The pins 86 turnably mount arms 88 which have meshing toothed portions 90 by which the arms are geared to turn in opposite directions. The arms 88 are connected with links 38, 40 which in turn connect with the bell cranks 76. Actuation of the arms 88 is effected by a release handle 92 which is shown connected to one of the pivot pins 86 to drive the latter and its arm 88 as seen in FIG. 5.

Referring to FIG. 6, the handle 92 is shown in the locked position flat against the cargo door 26. This position corresponds to the locking condition illustrated in FIGS. 5 and 7. When the handle 92 is swung upward and to the left (counterclockwise), it will exert pulls on the links 38, 40 causing the bell cranks 76 to withdraw the slide bolts 68. Upon this occurring, the cargo door 26 will be completely released as illustrated in FIG. 8 and as explained above in detail.

Further, in accordance with the invention, the lower pin 54 is of eccentric construction whereby the portions that bear in the arms 50 are slightly off-center with respect to the center portion. The pin 54 has a head 55 provided with wrench recesses as seen in FIG. 4 whereby it may be turned after assemblage of the hinge parts 44 and 46 to take up looseness and completely eliminate slack. Tightening of the lower pin 54 is effected by a screw 51 threaded into the end of the pin and acting against the side arms 50 of the hinge part 44. Tightening of the screw 51 prevents the lower pin 54 from turning out of its adjusted slack-eliminating position.

It will now be seen from the foregoing that there has been provided by the invention a novel and improved supporting, locking and release system for cargo doors or panels of helicopters and the like or other structures, which system operates on the cantilever principle whereby the cargo door or panel is supported and retained in place by separable hinge fittings along one edge of the door. In the present instance, two such fittings are provided, being coupled for simultaneous release, the said fittings being secured to beams or struts forming part of the door construction. The improved fittings of the invention constitute a powerful and durable means for releasably supporting the cargo door, yet one which is easily and quickly completely released for separation of the door from the aircraft. The cooperable parts of the fittings are formed of metal having high strength whereby the required forces can be tolerated with a wide safety margin. An advantageous leverage is provided by the release linkage and handle system, together with the release bell cranks, whereby the heavy forces imposed on the release bolts are adequately handled, with relatively little operating force being required of the operator.

It will be noted that the operating arms 88 and their attached links 38, 40 constitute toggle locks since they shift past dead center in attaining the locked positions of FIG. 6 from the releasing positions of the parts. This toggle arrangement prevents unlocking movement of the links 38, 40 except in response to initiating movement of the handle 92.

While the fitting part 44 is shown as having pins 52, 54 attached to it, the part may be formed with integral projecting pin-like formations, and may have other shapes since the cooperable relationship with the part 46 requires projections to be received in the slots 60, 62. The pins 52, 54 constitute one simple form of such projections.

Variations and modifications may be made within the scope of the claims, and portions of the improvement may be used without others.

I claim:
1. A cantilever-type attaching and release device for doors or closure panels, comprising in combination:
  (a) a pair of cooperable separable two-part hinge fittings, said fittings having means for attaching them to adjoining structures which are to be joined and later separated, wherein the improvement comprises:
  (b) said fittings having a pair of spaced-apart pin-and-slot connections the slotted portions of which are rigid and immovable with respect to each other and the pin portions of which are rigid and immovable with respect to each other,
  (c) only one of said connections, when the fittings are asesmbled, being capable of separation by relative pivotal movement of the fittings about the other connection as a pivotal axis, and
  (d) releasable manually operable restrainer means normally preventing separation of said one pin-and-slot connection whereby the fittings when assembled are rigidly secured to each other against relative movement and capable of a cantilever-type support of one by the other,
  (e) said restrainer means being operable at will to release said one pin-and-slot connection,
  (f) said other pin-and-slot connection being separable only after separation of said one pin-and-slot connection, thereby to completely free the fittings from each other.

2. An attaching and release device as in claim 1, wherein:
  (a) one of said fittings has the slots of said pin-and-slot connections,
  (b) said other fitting having pin-like projections receivable in said slots.

3. An attaching and release device as in claim 1, wherein:
 (a) one of said adjoining structures is of planar characteristic,
 (b) said pin-and-slot connections having their axes disposed in a plane which is diagonal to the plane of said one adjoining structure.

4. An attaching and release device as in claim 1, wherein:
 (a) the releasable restrainer means comprises a draw bolt slidably carried by one fitting,
 (b) the other of said fittings having a pin-like projection engaged by said draw bolt.

5. A device as in claim 1, wherein:
 (a) one fitting comprises a pair of spaced, parallel arms,
 (b) said pin-and-slot connections comprising a pair of spaced pins carried by and extending between said arms,
 (c) the other of said fittings comprising a portion receivable between said arms and having spaced slots which receive said spaced pins.

6. A cantilever-type attaching and release device for doors or closure panels, comprising in combination:
 (a) a pair of cooperable separable two-part hinge fittings, said fittings having means for attaching them to adjoining structures which are to be joined and later separated, wherein the improvement comprises:
 (b) said fittings having a pair of spaced-apart pin-and-slot connections,
 (c) only one of said connections being capable of separation when the fittings are assembled by relative pivotal movement of the fittings about the other connection as a pivotal axis, and
 (d) releasable manually operable restrainer means normally preventing separation of said one pin-and-slot connection whereby the fittings when assembled are rigidly secured to each other and capable of a cantilever-type support of one by the other,
 (e) said restrainer means being operable at will to release said one pin-and-slot connection,
 (f) said other pin-and-slot connection being separable only after separation of said one pin-and-slot connection, thereby to completely free the fittings from each other,
 (g) the releasable restrainer means comprising a draw bolt slidably carried by one fitting,
 (h) the other of said fittings having a pin-like projection engaged by said draw bolt,
 (i) the releasable restrainer means further comprising a bell-crank pivotally mounted on said one fitting and engaged with the bolt to withdraw the same.

7. A device as in claim 6 and including a second pair of said fittings and a second said releasable restrainer means therefor,
 (a) said releasable restrainer means further comprising a pair of aligned links connected to said bellcranks and extending toward and in close proximity to each other,
 (b) operating arms connected to the proximate ends of the links to actuate the same,
 (c) means coupling the arms for simultaneous, opposite turning movements, and
 (d) a manually engageable handle connected to one of said operating arms, to actuate the arms.

8. A device as in claim 7, wherein:
 (a) said links and operating arms comprise toggle locks which prevent unlocking movement of the links except in response to movement of said handle.

9. A device as in claim 6, wherein:
 (a) the releasable restrainer means includes a toggle lock comprising an elongate link connected to the bellcrank and a short operating arm pivotally connected to said link, and
 (b) a handle connected to said operating arm to actuate the same.

10. A cantilever-type attaching and release device for doors or closure panels, comprising in combination:
 (a) a pair of cooperable separable two-part hinge fittings, said fittings having means for attaching them to adjoining structures which are to be joined and later separated, wherein the improvement comprises:
 (b) said fittings having a pair of spaced-apart pin-and-slot connections,
 (c) only one of said connections being capable of separation when the fittings are assembled by relative pivotal movement of the fittings about the other connection as a pivotal axis, and
 (d) releasable manually operable restrainer means normally preventing separation of said one pin-and-slot connection whereby the fittings when assembled are rigidly secured to each other and capable of a cantilever-type support of one by the other,
 (e) said restrainer means being operable at will to release said one pin-and-slot connection,
 (f) said other pin-and-slot connection being separable only after separation of said one pin-and-slot connection, thereby to completely free the fittings from each other,
 (g) one of said pin-and-slot connections comprising a pin turnably carried by one fitting,
 (h) means for eccentrically mounting said pin whereby the center distance thereof from the other pin-and-slot connection can be varied by adjustably turning the pin, and
 (i) means for securing said one pin in different adjusted rotative positions on its fitting, thereby to enable slack between the fittings to be taken up.

References Cited

UNITED STATES PATENTS

| | | | |
|---|---|---|---|
| 938,267 | 10/1909 | Morris | 24—1 |
| 2,208,871 | 7/1940 | Rogers | 126—194 |
| 2,842,117 | 7/1958 | Berge et al. | 126—194 |
| 3,131,892 | 5/1964 | Salmun | 49—453 X |
| 3,147,942 | 9/1964 | Griffith | 244—129 X |

MARVIN A. CHAMPION, *Primary Examiner.*

JOHN R. MOSES, *Assistant Examiner.*

U.S. Cl. X.R.

244—129; 287—119; 292—36, 167